United States Patent
Wang et al.

(10) Patent No.: US 9,133,396 B2
(45) Date of Patent: Sep. 15, 2015

(54) LIQUID CRYSTAL COMPOUND HAVING NEGATIVE DIELECTRIC ANISOTROPY, AND LIQUID CRYSTAL COMPOSITION

(71) Applicant: DAXIN MATERIALS CORP., Taichung (TW)

(72) Inventors: Chun-Chih Wang, Taichung (TW); Yu-Ying Hsieh, Taichung (TW); Hui-Ju Yu, Taichung (TW)

(73) Assignee: DAXIN MATERIALS CORP., Taichung (TW)

( * ) Notice: Subject to any disclaimer, the term of this patent is extended or adjusted under 35 U.S.C. 154(b) by 0 days.

(21) Appl. No.: 14/048,546

(22) Filed: Oct. 8, 2013

(65) Prior Publication Data

US 2014/0103257 A1 Apr. 17, 2014

(30) Foreign Application Priority Data

Oct. 15, 2012 (TW) .............................. 101137950 A

(51) Int. Cl.
| | | |
|---|---|---|
| *C09K 19/12* | (2006.01) | |
| *C09K 19/00* | (2006.01) | |
| *C07C 43/20* | (2006.01) | |
| *C07C 22/00* | (2006.01) | |
| *C09K 19/30* | (2006.01) | |

(52) U.S. Cl.
CPC ...................................... *C09K 19/30* (2013.01)

(58) Field of Classification Search
CPC ........ C09K 19/30; C09K 19/12; C09K 19/00; C07C 43/20; C07C 22/00
USPC ............... 252/299.01, 299.6, 299.63, 299.66; 428/1.1; 568/300, 579, 626, 659, 661; 570/101, 123, 124, 127, 129
See application file for complete search history.

(56) References Cited

U.S. PATENT DOCUMENTS 8,801,966 B2 * 8/2014 Chen et al. ................ 252/299.63

* cited by examiner

*Primary Examiner* — Geraldina Visconti
(74) *Attorney, Agent, or Firm* — Birch, Stewart, Kolasch & Birch, LLP

(57) ABSTRACT

A liquid crystal composition includes a liquid crystal compound having a formula (I), where $R^1$ and $R^2$ are independently selected from the group consisting of H, C1-C10 alkyl, C2-C10 alkenyl, C1-C10 alkoxyl, C2-C10 alkenyloxy, C1-C10 ether, C1-C10 aldehyde, C1-C10 ketone, and C1-C10 ester; A is selected from the group consisting of

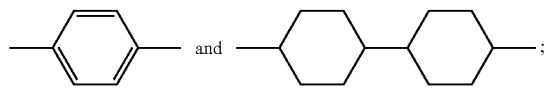

and $X^1$, $X^2$, $X^3$ and $X^4$ are independently selected from the group consisting of H, halogen group, —$CF_3$, —$CHF_2$, —$CH_2F$, —$OCF_3$, —$OCHF_2$ and —$OCH_2F$, at least one of $X^1$, $X^2$, $X^3$ and $X^4$ being halogen group, —$CF_3$, —$CHF_2$, —$CH_2F$, —$OCF_3$, —$OCHF_2$ or —$OCH_2F$.

(I)

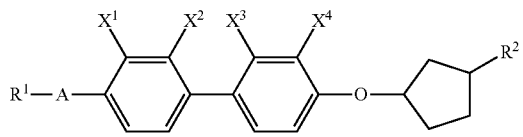

19 Claims, No Drawings

LIQUID CRYSTAL COMPOUND HAVING NEGATIVE DIELECTRIC ANISOTROPY, AND LIQUID CRYSTAL COMPOSITION

CROSS-REFERENCE TO RELATED APPLICATION

This application claims priority of Taiwanese application no. 101137950, filed on Oct. 15, 2012.

BACKGROUND OF THE INVENTION

1. Field of the Invention

This invention relates to a liquid crystal compound, more particularly to a liquid crystal compound having negative dielectric anisotropy, and a liquid crystal composition including the same.

2. Description of the Related Art

Compared with a twisted nematic liquid crystal display unit, a vertical alignment liquid crystal display unit has the advantages of wider viewing angle, higher contrast, faster response time, etc. A liquid crystal compound used in such a vertical alignment liquid crystal display unit should have negative dielectric anisotropy ($\Delta\varepsilon$), good light and heat stability, a broad nematic temperature range, fast response time, etc.

In order to have a broad nematic temperature range, it is desirable to lower the crystal-to-nematic transition temperature ($T_c$), and to increase the nematic-to-liquid transition temperature ($T_{ni}$). Besides, if a liquid crystal compound has an increased refractive index anisotropy ($\Delta n$), a cell gap for filling with liquid crystal can be reduced. Faster response time can be achieved by reducing rotational viscosity ($\gamma 1$) and increasing the absolute value of $\Delta\varepsilon$. A conventional liquid crystal compound having negative dielectric anisotropy generally has a 2-3-difluorophenyl group. However, although such a conventional liquid crystal compound has good light and heat stability, it has a relatively high rotational viscosity and low refractive index anisotropy.

For example, U.S. patent application publication no. 2011/0089374 A1 discloses two liquid crystal compounds respectively represented by the following formulas (A) and (B) (also see structures I-44 and I-45 of the U.S. publication).

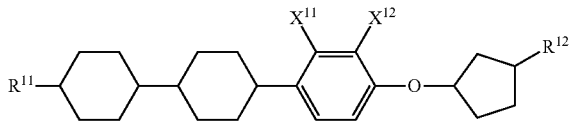

(A)

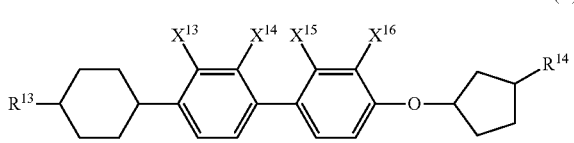

(B)

where $R^{11}$ and $R^{13}$ are each independently C1-C7 n-alkyl or C1-C7 alkyloxy; $R^{12}$ and $R^{14}$ are each independently H or C1-C7 n-alkyl; $X^{11}$, $X^{12}$, $X^{15}$ and $X^{16}$ are each independently selected from the group consisting of F, Cl, $CF_3$, $CHF_2$, $OCF_3$ and $OCF_2H$; and $X^{13}$ and $X^{14}$ are each independently H or F.

It is disclosed in said U.S. publication that the two liquid crystal compounds of formulas (A) and (B) have negative dielectric anisotropy. However, specific examples of the two liquid crystal compounds and other properties of the two liquid crystal compounds (such as refractive index anisotropy, nematic temperature range, etc.) are not disclosed therein.

It would be helpful to the development of vertical alignment liquid crystal displays if a liquid crystal compound having negative dielectric anisotropy, suitable refractive index anisotropy, and a wide nematic temperature range can be developed.

SUMMARY OF THE INVENTION

An object of the present invention is to provide a liquid crystal compound and a liquid crystal composition including the same. The liquid crystal compound has a high absolute value of $\Delta\varepsilon$, high refractive index anisotropy ($\Delta n$), good light and heat stability, and a broad nematic temperature range. Thus, the liquid crystal composition including the liquid crystal compound is adapted to be used in a vertical alignment liquid crystal display unit.

According to a first aspect of this invention, a liquid crystal composition includes a liquid crystal compound having a formula (I):

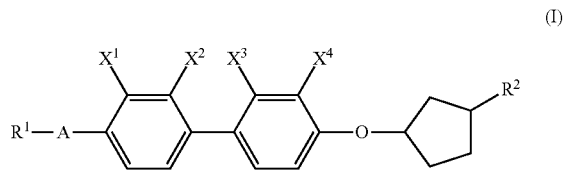

(I)

where $R^1$ and $R^2$ are independently selected from the group consisting of H, C1-C10 alkyl, C2-C10 alkenyl, C1-C10 alkoxyl, C2-C10 alkenyloxy, C1-C10 ether, C1-C10 aldehyde, C1-C10 ketone, and C1-C10 ester;

A is selected from the group consisting of

―⟨phenyl⟩― and ―⟨cyclohexyl⟩⟨cyclohexyl⟩―;

and $X^1$, $X^2$, $X^3$ and $X^4$ are independently selected from the group consisting of H, halogen group, $-CF_3$, $-CHF_2$, $-CH_2F$, $-OCF_3$, $-OCHF_2$ and $-OCH_2F$, at least one of $X^1$, $X^2$, $X^3$ and $X^4$ being halogen group, $-CF_3$, $-CHF_2$, $-CH_2F$, $-OCF_3$, $-OCHF_2$ or $-OCH_2F$.

According to a second aspect of this invention, a liquid crystal compound has a formula (IV):

$$R^1-\left[A^1\right]_m-\left[A^2\right]_n-\left[\text{Ar}(X^1,X^2)\right]_o-\left[\text{Ar}(X^3,X^4)\right]_p-O-\text{cyclopentyl}-R^2$$

(IV)

where $R^1$ and $R^2$ are independently selected from the group consisting of H, C1-C10 alkyl, C2-C10 alkenyl, C1-C10 alkoxyl, C2-C10 alkenyloxy, C1-C10 ether, C1-C10 aldehyde, C1-C10 ketone, and C1-C10 ester;

rings $A^1$ and $A^2$ are independently selected from the group consisting of fluorine-substituted and unsubstituted 1,4-phenylene, fluorine-substituted and unsubstituted 1,4-cyclohexylene, 2,5-tetrahydropyranylene, and 3,6-tetrahydropyranylene;

$X^1$, $X^2$, $X^3$, and $X^4$ are independently selected from the group consisting of H, halogen group, —$CF_3$, —$CHF_2$, —$CH_2F$, —$OCF_3$, —$OCHF_2$ and —$OCH_2F$, at least one of $X^1$, $X^2$, $X^3$ and $X^4$ being halogen group, —$CF_3$, —$CHF_2$, —$CH_2F$, —$OCF_3$, —$OCHF_2$ or —$OCH_2F$; and m+n=1 or 2, o and p are independently 1 or 2, and m+n+o+p≥3, wherein when o or p is 2, two substituted phenylene rings are the same or different, and wherein when m+n=1 and each of o and p is 1, both rings $A^1$ and $A^2$ are not 1,4-cyclohexylene.

Preferably, $R^1$ and $R^2$ are independently selected from C2-C5 alkyl. Rings $A^1$ and $A^2$ are independently selected from the group consisting of 1,4-phenylene and 1,4-cyclohexylene.

Preferably, o=1 and p=1. $X^1$ is H, $X^2$ is H or F, and $X^3$ and $X^4$ are independently selected from the group consisting of halogen group, —$CF_3$, —$CHF_2$, —$CH_2F$, —$OCF_3$, —$OCHF_2$ and —$OCH_2F$.

Preferably, m=1, n=0, and ring $A^1$ is 1,4-phenylene.

Preferably, m=1, n=1, and rings $A^1$ and $A^2$ each are 1,4-cyclohexylene.

According to a third aspect of this invention, a liquid crystal composition includes a primary liquid crystal compound having a formula (IV):

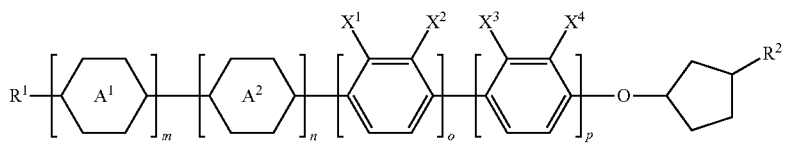

(IV)

where $R^1$ and $R^2$ are independently selected from the group consisting of H, C1-C10 alkyl, C2-C10 alkenyl, C1-C10 alkoxyl, C2-C10 alkenyloxy, C1-C10 ether, C1-C10 aldehyde, C1-C10 ketone, and C1-C10 ester;

rings $A^1$ and $A^2$ are independently selected from the group consisting of fluorine-substituted and unsubstituted 1,4-phenylene, fluorine-substituted and unsubstituted 1,4-cyclohexylene, 2,5-tetrahydropyranylene, and 3,6-tetrahydropyranylene;

$X^1$, $X^2$, $X^3$ and $X^4$ are independently selected from the group consisting of H, halogen group, —$CF_3$, —$CHF_2$, —$CH_2F$, —$OCF_3$, —$OCHF_2$ and —$OCH_2F$, at least one of $X^1$, $X^2$, $X^3$ and $X^4$ being halogen group, —$CF_3$, —$CHF_2$, —$CH_2F$, —$OCF_3$, —$OCHF_2$ or —$OCH_2F$; and m+n=1 or 2, o and p are independently 1 or 2, and m+n+o+p≥3, wherein when o or p is 2, two substituted phenylene rings are the same or different, and wherein when m+n=1 and each of o and p is 1, both rings $A^1$ and $A^2$ are not 1,4-cyclohexylene.

Preferably, the liquid crystal composition further includes:

a secondary liquid crystal compound having a formula (II):

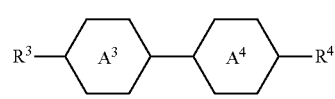

(II)

where $R^3$ and $R^4$ are independently selected from the group consisting of H, C1-C10 alkyl, C1-C10 alkoxyl and C2-C10 alkenyl; and rings $A^3$ and $A^4$ are independently selected from the group consisting of 1,4-phenylene and 1,4-cyclohexylene; and a tertiary liquid crystal compound having a formula (III):

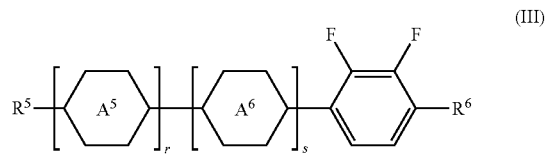

(III)

where $R^5$ and $R^6$ are independently selected from the group consisting of H, C1-C10 alkyl, C1-C10 alkoxyl and C2-C10 alkenyl;

rings $A^5$ and $A^6$ are independently selected from the group consisting of 1,4-phenylene and 1,4-cyclohexylene; and r=1 and s=0 or 1.

Preferably, the liquid crystal composition comprises 3-20 wt % of the primary liquid crystal compound, 20-40 wt % of the secondary liquid crystal compound, and 40-75 wt % of the tertiary liquid crystal compound, based on the total weight of the liquid crystal composition.

More preferably, the liquid crystal composition comprises 3-12 wt % of the primary liquid crystal compound, 20-30 wt % of the secondary liquid crystal compound, and 60-75 wt % of the tertiary liquid crystal compound, based on the total weight of the liquid crystal composition.

DETAILED DESCRIPTION OF THE PREFERRED EMBODIMENTS

A preferred embodiment of a liquid crystal compound (hereinafter referred to as "liquid crystal compound (I)") according to this invention has the formula (I):

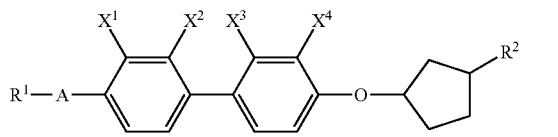

(I)

where

R$^1$ and R$^2$ are independently selected from the group consisting of H, C1-C10 alkyl, C2-C10 alkenyl, C1-C10 alkoxyl, C2-C10 alkenyloxy, C1-C10 ether, C1-C10 aldehyde, C1-C10 ketone, and C1-C10 ester;

A is selected from the group consisting of

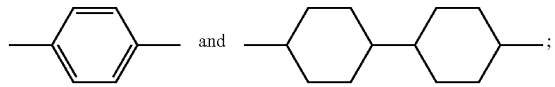

and

X$^1$, X$^2$, X$^3$ and X$^4$ are independently selected from the group consisting of H, halogen group, —CF$_3$, —CHF$_2$, —CH$_2$F, —OCF$_3$, —OCHF$_2$ and —OCH$_2$F, at least one of X$^1$, X$^2$, X$^3$ and X$^4$ being halogen group, —CF$_3$, —CHF$_2$, —CH$_2$F, —OCF$_3$, —OCHF$_2$ or —OCH$_2$F.

Preferably, R$^1$ and R$^2$ are independently selected from C2-C5 alkyl.

Preferably, X$^1$, X$^2$, X$^3$ and X$^4$ are independently selected from the group consisting of H and F, and at least one of X$^1$, X$^2$, X$^3$ and X$^4$ is F.

Preferably, the liquid crystal compound (I) has one of the formulas (I-1) to (I-4):

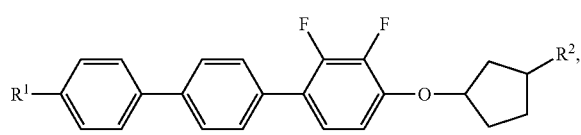
(I-1)

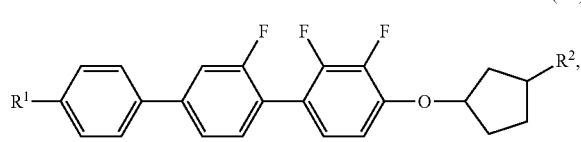
(I-2)

-continued

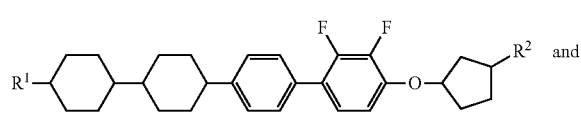
(I-3)

(I-4)

More preferably, the liquid crystal compound (I) is one of the following:

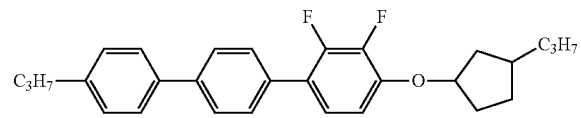

(Example 1, hereinafter also referred to as "3PPYOCp3"),

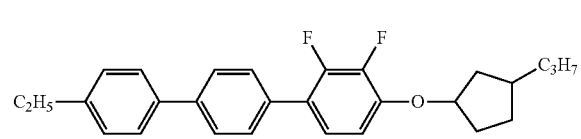

(Example 2, hereinafter also referred to as "2PPYOCp3"),

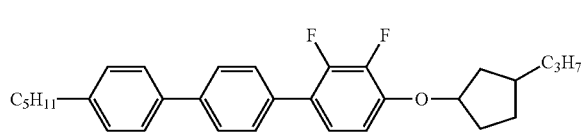

(Example 3, hereinafter also referred to as "5PPYOCp3"),

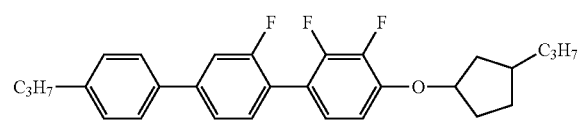

(Example 4, hereinafter also referred to as "3PGYOCp3"),

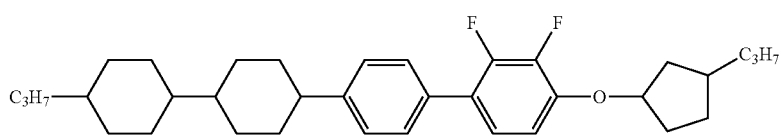

(Example 5, hereinafter also referred to as "3CCPYOCp3"),

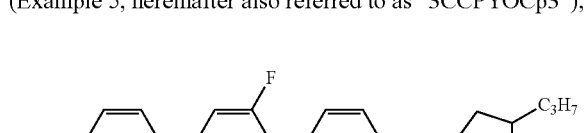

and
(Example 6, hereinafter also referred to as "3PGPOCp3").

The dielectric anisotropy (Δ∈) of the liquid crystal compound (I) ranges from −3.0 to −7.3, preferably from −3.2 to −7.3, and more preferably from −5.0 to −7.3.

The refractive index anisotropy (Δn) of the liquid crystal compound (I) ranges from 0.04 to 0.24, preferably from 0.10 to 0.24, and more preferably from 0.19 to 0.24.

The rotational viscosity (γ1) of the liquid crystal compound (I) ranges from −300 mPa·s to 205 mPa·s, preferably from −300 mPa·s to 115 mPa·s, and more preferably from −300 mPa·s to 82 mPa·s.

A preferred embodiment of a liquid crystal composition according to this invention includes the liquid crystal compound (I).

Preferably, the liquid crystal composition further includes liquid crystal compounds (II) and (III).

The liquid crystal compound (II) has the formula (II):

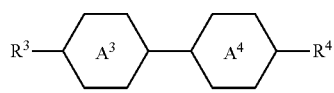
(II)

where

R³ and R⁴ are independently selected from the group consisting of H, C1-C10 alkyl, C1-C10 alkoxyl and C2-C10 alkenyl; and rings A³ and A⁴ are independently selected from the group consisting of 1,4-phenylene and 1,4-cyclohexylene.

Further information regarding the liquid crystal compound (II) can be found in Japanese patent publication nos. S59-070624 and S60-018571.

The liquid crystal compound (III) has the formula (III):

(III)

where

R⁵ and R⁶ are independently selected from the group consisting of H, C1-C10 alkyl, C1-C10 alkoxyl and C2-C10 alkenyl;

rings A⁵ and A⁶ are independently selected from the group consisting of 1,4-phenylene and 1,4-cyclohexylene; and r=1 and s=0 or 1.

Further information regarding the liquid crystal compound (III) can be found in U.S. Pat. No. 5,248,447.

Preferably, the liquid crystal composition includes 3-20 wt % of the liquid crystal compound (I), 20-40 wt % of the liquid crystal compound (II), and 40-75 wt % of the liquid crystal compound (III), based on the total weight of the liquid crystal composition.

More preferably, the liquid crystal composition comprises 3-12 wt % of the liquid crystal compound (I), 20-30 wt % of the liquid crystal compound (II), and 60-75 wt % of the liquid crystal compound (III), based on the total weight of the liquid crystal composition.

Preferably, the liquid crystal compound (II) includes at least one of the following:

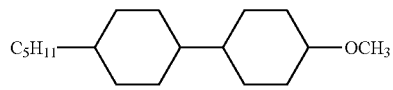

(hereinafter referred to as "5CCO1"),

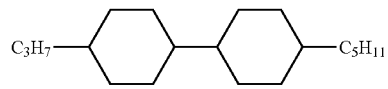

(hereinafter referred to as "3CC5"), and

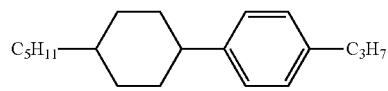

(hereinafter referred to as "5CP3").

Preferably, the liquid crystal compound (III) includes at least one of the following:

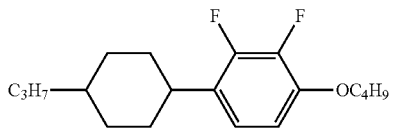

(hereinafter referred to as "3CYO4"),

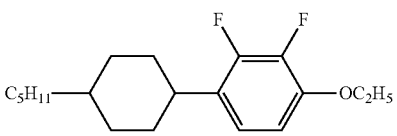

(hereinafter referred to as "5CYO2"),

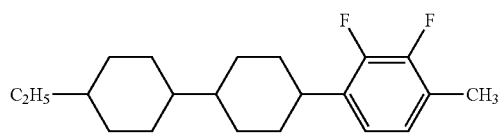

(hereinafter referred to as "2CCY1"),

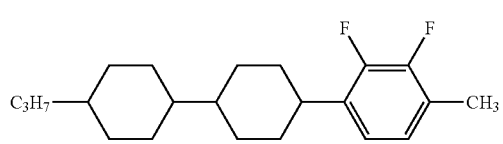

(hereinafter referred to as "3CCY1"),

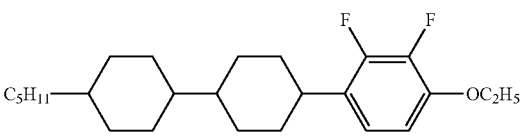

(hereinafter referred to as "5CCYO2"),

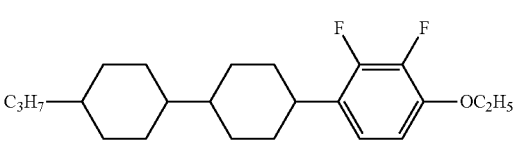

(hereinafter referred to as "3CCYO2"), and

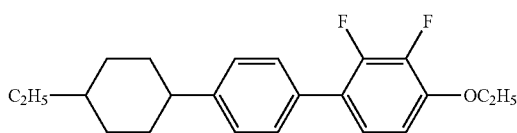 [SMILES: CCOc1ccc(-c2ccc(C3CCC(CC)CC3)cc2)c(F)c1F]

(hereinafter referred to as "2CPYO2").

In the preferred embodiment, the liquid crystal composition is obtained by mixing the liquid crystal compounds (I), (II) and (III).

The liquid crystal compound (I) has a high absolute value of $\Delta\epsilon$, high refractive index anisotropy ($\Delta n$), good light and heat stability, and a broad nematic temperature range. Thus, the liquid crystal composition including the liquid crystal compound (I) may have negative dielectric anisotropy ($\Delta n$), and desired refractive index anisotropy and rotational viscosity ($\gamma 1$), and is adapted to be used in a vertical alignment liquid crystal display unit.

The present invention will now be explained in more detail below by way of the following examples and comparative examples.

Synthesis of Liquid Crystal Compounds

Example 1 (EX1)

Synthesis of 3PPYOCp3

3PPYOCp3 was synthesized by the following steps (1) to (4) according to the following Schemes 1 and 2.

Scheme 1

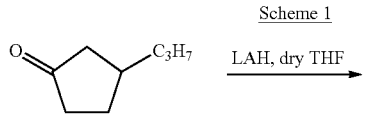

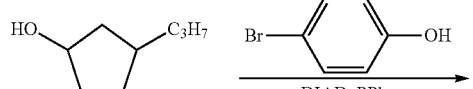

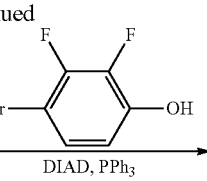

Scheme 2

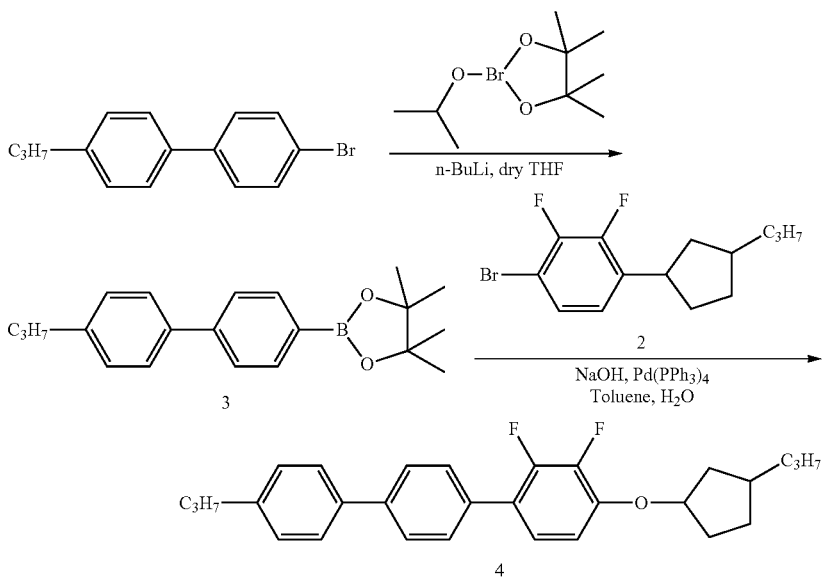

Step (1) Synthesis of 3-propylcyclopentanol (compound 1 shown in scheme 1)

5 g (39 mmol) of 3-propylcyclopentanone was added to a 250 ml single-neck flask, and tetrahydrofuran (THF) was added and mixed evenly therewith to obtain a THF solution. Then the THF solution was poured into a 250 ml two-neck round-bottom flask containing 0.75 g (19.8 mmol) of lithium aluminum hydride (LAH) and dry tetrahydrofuran (dry THF), and the two-neck round-bottom flask was placed in an ice bath under nitrogen gas ambient for 1 hour to allow reaction to occur. After the reaction was completed, distilled water was slowly added until the reaction mixture in the two-neck round-bottom flask became milky white in color. Thereafter, the reaction mixture was filtered off under reduced pressure to remove the solid part and to collect filtrate. The filtrate was extracted using an extracting solution including ethyl acetate and distilled water, followed by a vacuum concentration process to remove solvent(s) thereby obtaining 5.08 g of the compound 1 shown in scheme 1 (yield: 99%).

Step (2) Synthesis of 1-(3-propylcyclopentyloxy)-4-bromo-2,3-difluorobenzene (compound 2 shown in scheme 1)

1 g (7.8 mmol) of compound 1, 2.45 g (11.72 mmol) of 4-bromo-2,3-difluorophenol, and 4.1 g (15.6 mmol) of triphenylphosphine (PPh$_3$) were added to a 250 ml two-neck round-bottom flask, and then THF was added to and mixed evenly therewith to allow a reaction to take place at room temperature under nitrogen gas ambient for 15 minutes. Then, 3.1 ml (15.5 mmol) of diisopropyl azodicarboxylate (DIAD) was slowly added to allow a reaction to take place at room temperature for 14 hours. After the reaction was completed, the reaction mixture was vacuum concentrated to remove solvent(s) and to collect a product. To this product was added a small amount of dichloromethane sufficient to dissolve the product so as to obtain a product solution. The product solution was slowly added to n-hexane of an amount ten times greater than that of the product solution to permit precipitation of solids, followed by filtration under reduced pressure to remove the solids and to collect filtrate. The filtrate was vacuum concentrated to remove solvent(s), and then purified by column chromatography (eluting solvent: ethyl acetate/n-hexane=1/5), thereby obtaining 2.2 g of the compound 2 shown in scheme 1 (yield 59%).

Step (3) Synthesis of 4-(4,4,5,5-tetramethyl-1,3,2-dioxaborolane)-4'-propylbiphenyl (compound 3 shown in scheme 2)

3 g (10.9 mmol) of 4-bromo-4'-propylbiphenyl was dissolved in 100 ml of dry THF, and then poured into a 250 ml two-neck round-bottom flask. Subsequently, 5.6 ml (14.2 mmol) of n-butyllithium (n-BuLi) was slowly injected into the two-neck round-bottom flask at a low temperature (−78° C.) under nitrogen gas ambient to allow a reaction to take place at the low temperature for one hour, and 2.7 ml (10.9 mmol) of 2-isopropoxy-4,4,5,5-tetramethyl-1,3,2-dioxaborolane was further injected slowly into the two-neck round-bottom flask to allow a reaction to take place for another one hour. After the reaction was completed, the reaction mixture was vacuum concentrated to remove solvent(s) and to collect 3.4 g of the compound 3 shown in scheme 2 (yield 98%).

Step (4) Synthesis of 3PPYOCp3 (compound 4 shown in scheme 2)

1 g (3.5 mmol) of compound 2, 1 g (3.1 mmol) of compound 3, 0.37 g (9.3 mmol) of sodium hydroxide, and 0.5 ml of a surfactant (Aliquat 336) were added to a 250 ml two-neck round-bottom flask, and then 80 ml of toluene and 20 ml of distilled water were added. After the solids in the two-neck round-bottom flask were dissolved, 0.1 g (0.09 mmol) of tetrakis(triphenylphosphine)palladium(0) was added under nitrogen gas ambient to allow a reaction to take place at 90° C. for 5 hours. After the reaction was completed, the reaction mixture was extracted using an extracting solution including ethyl acetate and distilled water to obtain an organic phase. After the organic phase was processed to remove solvent(s) therefrom, it was purified by column chromatography (eluting solvent: n-hexane), thereby obtaining 0.4 g of the compound 4 shown in scheme 2 (3PPYOCp3, yield 30%). $^1$H-NMR (300 MHz, CDCl$_3$) δ/ppm: 0.89-0.95 (t, 3H), 0.96-1.00 (t, 3H), 1.17-1.52 (m, 6H), 1.58-1.84 (m, 2H), 1.86-2.09 (m, 3H), 2.11-2.19 (m, 2H), 2.61-2.71 (t, 2H), 4.82-4.85 (m, 1H), 6.74-6.80 (t, 1H), 7.09-7.25 (t, 1H), 7.28-7.53 (d, 2H), 7.55-7.58 (m, 4H), 7.64-7.67 (d, 2H). EI-MS m/z: 434 [M]$^+$.

Example 2 (EX2)

Synthesis of 2PPYOCp3

2PPYOCp3 was synthesized according to the process employed for synthesizing 3PPYOCp3 (Example 1), except that:

in step (3) of Example 2, 4-bromo-4'-ethylbiphenyl was used to replace 4-bromo-4'-propylbiphenyl, thereby obtaining 4-(4,4,5,5-tetramethyl-1,3,2-dioxaborolane)-4'-ethylbiphenyl; and in step (4) of Example 2, 4-(4,4,5,5-tetramethyl-1,3,2-dioxaborolane)-4'-ethylbiphenyl was used to replace compound 3, thereby obtaining 2PPYOCp3. $^1$H-NMR (400 MHz, CDCl$_3$) δ/ppm: 0.91-0.93 (t, 3H), 1.26-1.35 (m, 10H), 1.86-2.09 (m, 3H), 2.11-2.19 (m, 2H), 2.67-2.75 (q, 2H), 4.86 (m, 1H), 6.78-6.81 (t, 1H), 7.12-7.25 (t, 1H), 7.26-7.31 (d, 2H), 7.55-7.59 (m, 4H), 7.64-7.67 (d, 2H). EI-MS m/z: 420 [M]$^+$.

Example 3 (EX3)

Synthesis of 5PPYOCp3

5PPYOCp3 was synthesized according to the process employed for synthesizing 3PPYOCp3 (Example 1), except that:

in step (3) of Example 3, 4-Bromo-4'-pentylbiphenyl was used to replace 4-bromo-4'-propylbiphenyl thereby obtaining 4-(4,4,5,5-tetramethyl-1,3,2-dioxaborolane)-4'-pentylbiphenyl; and in step (4) of Example 3, 4-(4,4,5,5-tetramethyl-1,3,2-dioxaborolane)-4'-pentylbiphenyl was used to replace compound 3, thereby obtaining 5PPYOCp3. $^1$H-NMR (400 MHz, CDCl$_3$) δ/ppm: 0.89-0.93 (t, 6H), 1.32-1.38 (m, 10H), 1.66-1.69 (m, 2H), 1.86-2.35 (m, 5H), 2.63-2.68 (t, 2H), 4.80-4.85 (m, 1H), 6.75-6.80 (t, 1H), 7.09-7.12 (t, 1H), 7.26-7.28 (d, 2H), 7.54-7.58 (m, 4H), 7.64-7.67 (d, 2H). EI-MS m/z: 462 [M]$^+$.

Example 4 (EX4)

Synthesis of 3PGYOCp3

3PGYOCp3 was synthesized by the following steps according to the following Scheme 3.

Scheme 3

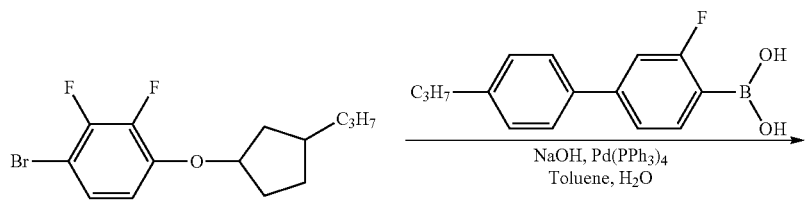

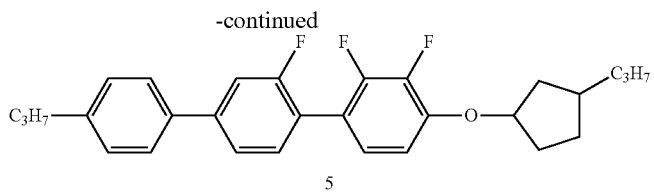

5

1 g (3.1 mmol) of compound 2, 0.7148 g (2.73 mmol) of 3-fluoro-4'-propylbiphenyl-4-yl)boronic acid, 0.32 g (8.2 mmol) of sodium hydroxide, and 0.1 ml of a surfactant (Aliquat 336) were added to a 100 ml two-neck round-bottom flask, and then 20 ml of toluene and 8 ml of distilled water were added. After the solids in the two-neck round-bottom flask were dissolved, 0.16 g (0.14 mmol) of tetrakis-(triphenylphosphine)palladium(0) was added under nitrogen gas ambient to allow a reaction to take place at 90° C. for 4 hours. After the reaction was completed, the reaction mixture was extracted using an extracting solution including ethyl acetate and distilled water to obtain an organic phase. After the organic phase was processed to remove solvent(s) therefrom, it was purified by column chromatography (eluting solvent: ethyl acetate/n-hexane=1/8), thereby obtaining 1.0 g of compound 5 shown in scheme 3 (3PGYOCp3, yield 82%). $^1$H-NMR (400 MHz, CDCl$_3$) δ/ppm: 0.89-0.94 (t, 3H), 0.96-1.01 (t, 3H), 1.17-1.52 (m, 6H), 1.68-1.70 (m, 2H), 1.71-2.51 (m, 5H), 2.62-2.67 (t, 2H), 4.83-4.86 (m, 1H), 6.75-6.81 (t, 1H), 7.04-7.09 (t, 1H), 7.26-7.29 (d, 2H), 7.36-7.45 (m, 3H), 7.52-7.55 (d, 2H). EI-MS m/z: 452 [M]$^+$.

Example 5 (EX5)

Synthesis of 3CCPYOCp3

3CCPYOCp3 was synthesized by the following steps (1a) to (6a) according to the following Scheme 4.

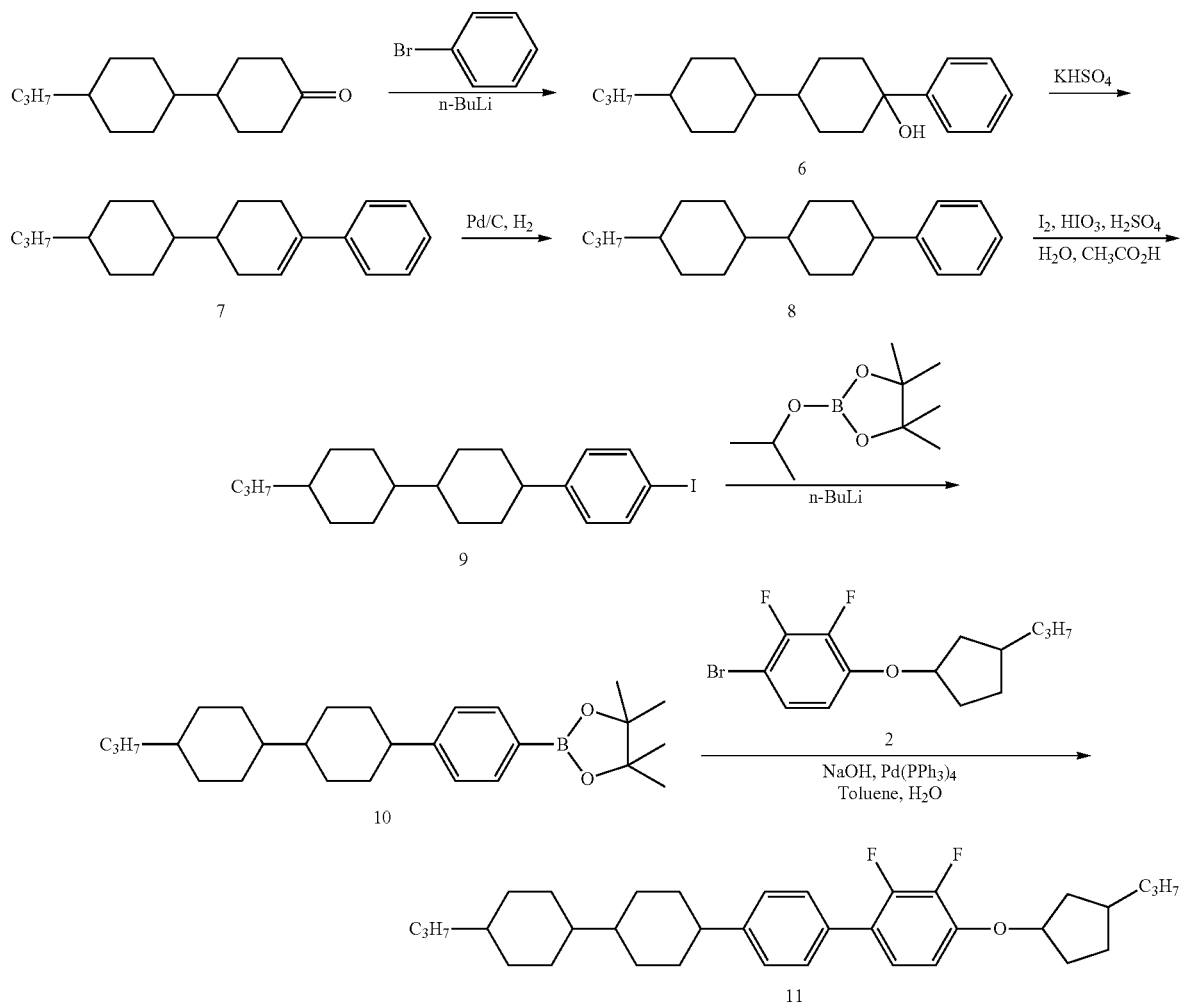

Step (1a) Synthesis of 1-phenyl-4-(4-propylcyclohexyl)cyclohexanol (compound 6 shown in scheme 4)

5 g (22.48 mmol) of 1-bromobenzene was dissolved in dry THF, and then poured into a 250 ml two-neck round-bottom flask. Subsequently, 11.7 ml (29.23 mmol) of n-butyllithium (n-BuLi) was slowly injected into the two-neck round-bottom flask at a low temperature (−78° C.) under nitrogen gas ambient to allow a reaction to take place at the low temperature for one hour, and 3.53 g (22.48 mmol) of 4-(4-propylcyclohexyl)cyclohexanone was further slowly injected to allow a reaction to take place for another one hour. After the reaction was completed, the reaction mixture was vacuum concentrated to remove solvent(s), and then was extracted using an extracting solution including ethyl acetate and distilled water to obtain an organic phase. After the organic phase was processed to remove solvent(s) therefrom, it was purified by column chromatography (eluting solvent: n-hexane), thereby obtaining 3.5 g of the compound 6 shown in scheme 4 (yield 52%).

Step (2a) Synthesis of 1-(4-(4-propylcyclohexyl)cyclohex-1-enyl)benzene (compound 7 shown in scheme 4)

3.5 g (11.64 mmol) of compound 6 was added to a 250 ml two-neck round-bottom flask, and then 3 g of $KHSO_4$ was added to allow a reaction to take place at 110° C. for 5 hours. After the reaction was completed, the reaction mixture was filtered off under reduced pressure to remove the solid part and to collect filtrate. The filtrate was vacuum concentrated to remove solvent(s), and then purified by column chromatography (eluting solvent: n-hexane), thereby obtaining 3.0 g of the compound 7 shown in scheme 4 (yield 91%).

Step (3a) Synthesis of 1-iodo-4-(4-(4-propylcyclohexyl)cyclohexyl)benzene (compound 8 shown in scheme 4)

3.0 g (10.62 mmol) of compound 7 was placed in a 250 ml two-neck round-bottom flask, was dissolved using a mixture including 30 ml of toluene and 70 ml of methanol, followed by addition of 20 mg of palladium on carbon (Pd/C) to allow a reaction to take place under hydrogen gas ambient for 14 hours. After the reaction was completed, the reaction mixture was gravity filtered to remove the solid part and to collect filtrate. The filtrate was vacuum concentrated to remove solvent(s), and then purified by column chromatography (eluting solvent: n-hexane), thereby obtaining 2.9 g of the compound 8 shown in scheme 4 (yield 96%).

Step (4a) Synthesis of 1-iodo-4-(4-(4-propylcyclohexyl)cyclohexyl)benzene (compound 9 shown in scheme 4)

2.9 g of compound 8, 1.31 g of iodine, 0.62 g of periodic acid, 10 ml of sulfuric acid (98%), 15 ml of distilled water, and 90 ml of acetic acid (99%) were added to a 250 ml single-neck flask, and then heated under reflux at 85° C. for 18 hours, followed by extraction using an extracting solution including ethyl acetate and distilled water to obtain an organic phase. The organic phase was dehydrated using anhydrous magnesium sulfate, was gravity filtered to remove solids of magnesium sulfate, was vacuum concentrated to remove solvent(s), and was purified by column chromatography (eluting solvent: n-hexane), thereby obtaining 4.0 g of the compound 9 shown in scheme 4 (yield 94%).

Step (5a) Synthesis of 4,4,5,5-tetramethyl-2-(4-(4-(4-propylcyclohexyl)cyclohexyl)phenyl)-1,3,2-dioxaborolane (compound 10 shown in scheme 4)

1 g (2.4 mmol) of compound 9 was added to a 250 ml single-neck flask. After the flask was vacuumed and purged with nitrogen two times, dry THF was added. Thereafter, the flask was cooled to −78° C., and 1.26 ml (3.1 mmol) of n-butyllithium (n-BuLi) was slowly added to allow a reaction to take place at −78° C. for 1 hour, followed by slow addition of 0.6 ml of 2-isopropoxy-4,4,5,5-tetramethyl-1,3,2-dioxaborolane to allow the components in the flask to continue to react for another 1 hour. Then, the temperature was raised to room temperature, and 10 ml of distilled water was added. The reaction mixture was vacuum concentrated to remove THF, and extracted using an extracting solution including ethyl acetate and distilled water to obtain an organic phase. The organic phase was dehydrated using anhydrous magnesium sulfate, was gravity filtered to remove solids of magnesium sulfate, and was vacuum concentrated to remove solvent(s), thereby obtaining 0.7 g of the compound 10 shown in scheme 4 (yield 71%).

Step (6a) Synthesis of 3CCPYOCp3 (compound 11 shown in scheme 4)

0.7 g (1.7 mmol) of compound 10, 0.54 g (1.7 mmol) of compound 2, 0.2 g (5.0 mmol) of sodium hydroxide, 5 ml of distilled water, 30 ml of toluene, and 0.5 ml of a surfactant (Aliquat 336) were added to a 250 ml two-neck round-bottom flask, and then heated under reflux. Subsequently, 0.5 g of tetrakis(triphenyl phosphine)palladium(0) was added to allow the components in the flask to be heated under reflux for 18 hours. Next, the components in the flask were cooled to room temperature, and extracted using an extracting solution including ethyl acetate and distilled water to obtain an organic phase. The organic phase was dehydrated using anhydrous magnesium sulfate, was gravity filtered to remove solids of magnesium sulfate, was vacuum concentrated to remove solvent(s), and was purified by column chromatography (eluting solvent: n-hexane), thereby obtaining 0.5 g of the compound 11 shown in scheme 4 (3CCPYOCp3, yield 56%). $^1$H-NMR (400 MHz, $CDCl_3$) δ/ppm: 0.85-0.93 (m, 10H), 1.13-1.43 (m, 16H), 1.48-2.48 (m, 14H), 2.48-2.65 (t, 1H), 4.83 (m, 1H), 6.72-6.77 (t, 1H), 7.03-7.08 (t, 1H), 7.26-7.28 (d, 2H), 7.41-7.43 (d, 2H). EI-MS m/z: 522 [M]$^+$.

Example 6 (EX6)

Synthesis of 3PGPOCp3

3PGPOCp3 was synthesized by the following steps (1b) and (2b) according to the following Scheme 5.

Scheme 5

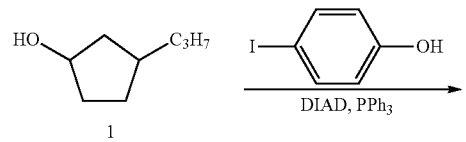

-continued

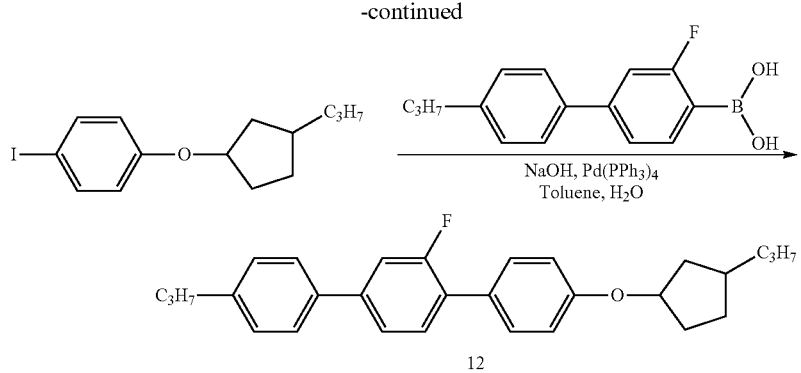

Step (1b) Synthesis of 1-(3-propylcyclopentyloxy)-4-iodobenzene 1 g (7.8 mmol) of compound 1, 2.58 g (11.72 mmol) of 4-iodo-phenol, and 4.1 g (15.6 mmol) of triphenylphosphine (PPh$_3$) were added to a 250 ml two-neck round-bottom flask, and then THF was added and mixed evenly therewith to allow a reaction to take place at room temperature under nitrogen gas ambient for 15 minutes. Then, 3.1 ml (15.5 mmol) of diisopropyl azodicarboxylate (DIAD) was slowly added to allow a reaction to take place at room temperature for 14 hours. After the reaction was completed, the reaction mixture was vacuum concentrated to remove solvent(s) and to collect a product. To this product was added a small amount of dichloromethane sufficient to dissolve the product so as to obtain a product solution. The product solution was slowly added to n-hexane of an amount ten times greater than that of the product solution to permit precipitation of solids, followed by filtration under reduced pressure to remove the solids and to collect filtrate. The filtrate was vacuum concentrated to remove solvent(s), and then purified by column chromatography (eluting solvent: ethyl acetate/n-hexane=1/5), thereby obtaining 2.5 g of 1-(3-propylcyclopentyloxy)-4-iodobenzene (yield 65%).

Step (2b) Synthesis of 3PGPOCp3 (compound 12 shown in scheme 5)

1 g (3.0 mmol) of 1-(3-propylcyclopentyloxy)-4-iodobenzene, 0.782 g (3.0 mmol) of 3-fluoro-4'-propylbiphenyl-4-yl) boronic acid, 0.37 g (9.3 mmol) of sodium hydroxide, and 0.1 ml of a surfactant (Aliquat 336) were added to a 100 ml two-neck round-bottom flask, and then 25 ml of toluene and 8 ml of distilled water were added. After the solids in the flask were dissolved, 0.20 g (0.15 mmol) of tetrakis(triphenylphosphine) palladium(0) was added under nitrogen gas ambient to allow a reaction to take place at 90° C. for 4 hours. After the reaction was completed, the reaction mixture was extracted using an extracting solution including ethyl acetate and distilled water to obtain an organic phase. After the organic phase was processed to remove solvent(s) therefrom, it was purified by column chromatography (eluting solvent: n-hexane), thereby obtaining 0.63 g of the compound 12 shown in scheme 5 (3PGPOCp3, yield 50%). $^1$H-NMR (400 MHz, CDCl$_3$) δ/ppm: 0.89-0.93 (t, 3H), 0.93-1.00 (t, 3H), 1.33-1.54 (m, 6H), 1.65-1.72 (m, 2H), 1.73-2.61 (m, 5H), 2.61-2.66 (t, 2H), 4.73-4.81 (m, 1H), 6.92-6.96 (d, 2H), 7.26-7.28 (d, 1H), 7.34-7.38 (m, 1H), 7.38-7.42 (m, 1H), 7.43-7.54 (m, 6H). EI-MS m/z: 416 [M]$^+$.

Comparative Example 1 (CE1)

Synthesis of 2CCYOCp3

2CCYOCp3 was synthesized by the following steps (1c) to (3c) according to the following Scheme 6.

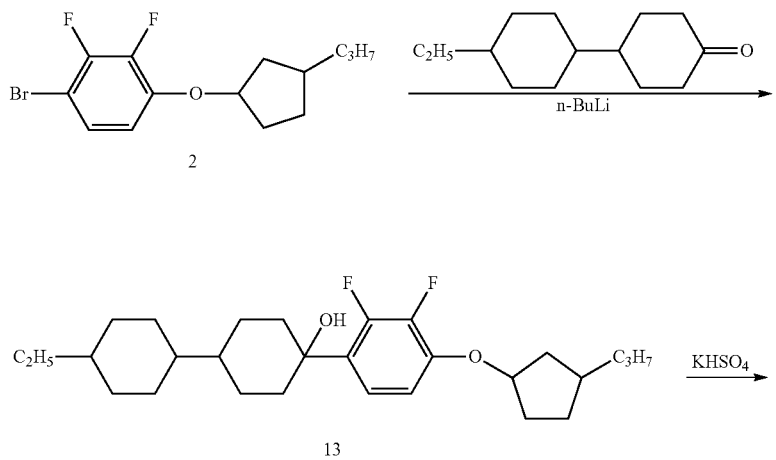

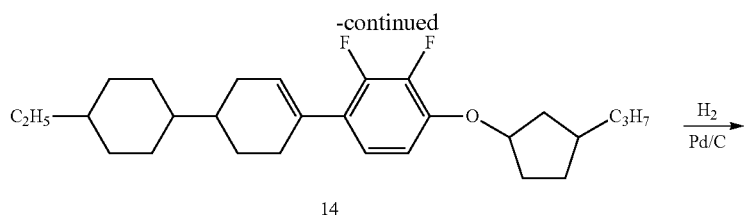

14

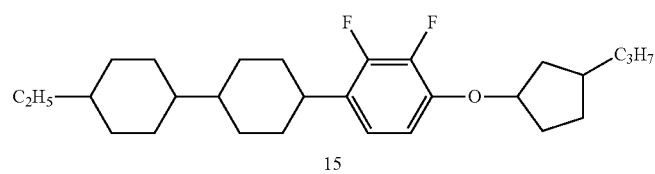

15

Step (1c) Synthesis of 1-(4-(3-propylcyclopentyloxy)-2,3-difluorophenyl)-4-(4-ethyl cyclohexyl) cyclohexanol (compound 13 shown in scheme 6)

0.4 g (1.25 mmol) of compound 2 was dissolved using dry THF, and then poured into a dry 100 ml two-neck round-bottom flask. 0.56 ml (1.63 mmol) of n-butyllithium (n-BuLi) was slowly injected into the two-neck round-bottom flask at a low temperature (−78° C.) under nitrogen gas ambient to allow a reaction to take place at the low temperature for one hour, and 0.23 g (1.25 mmol) of 4-(4-ethylcyclohexyl)cyclohexanone was further slowly injected to allow a reaction to take place for another one hour. After the reaction was completed, the reaction mixture was vacuum concentrated to remove solvent(s), and was extracted using an extracting solution including ethyl acetate and distilled water to obtain an organic phase. After the organic phase was processed to remove solvent(s) therefrom, it was purified by column chromatography (eluting solvent: n-hexane), thereby obtaining 0.3 g of the compound 13 shown in scheme 6 (yield 61%).

Step (2c) Synthesis of 1-(3-propylcyclopentyloxy)-4-(4-(4-ethylcyclohexyl)cyclohex-1-enyl)-2,3-difluorobenzene (compound 14 shown in scheme 6)

0.3 g (0.67 mmol) of compound 13 was added to a 250 ml two-neck round-bottom flask, and then 0.3 g of $KHSO_4$ was added to allow a reaction to take place at 110° C. for 5 hours. After the reaction was completed, the reaction mixture was filtered off under reduced pressure to remove the solid part and to collect filtrate. The filtrate was vacuum concentrated to remove solvent(s), and then purified by column chromatography (eluting solvent: n-hexane), thereby obtaining 0.24 g of the compound 14 shown in scheme 6 (yield 80%).

Step (3c) Synthesis of 2CCYOCp3 (compound 15 shown in scheme 6)

0.24 g (0.56 mmol) of compound 14 was placed in a 250 ml two-neck round-bottom flask, was dissolved using a mixture including 30 ml of toluene and 70 ml of methanol, followed by addition of 20 mg of palladium on carbon (Pd/C) to allow a reaction to take place under hydrogen gas ambient for 14 hours. After the reaction was completed, the reaction mixture was gravity filtered to remove the solid part and to collect filtrate. The filtrate was vacuum concentrated to remove solvent(s), and then purified by column chromatography (eluting solvent: n-hexane), thereby obtaining 0.24 g of the compound 15 shown in scheme 6 (2CCYOCp3, yield 99%). H-NMR (400 MHz, $CDCl_3$) δ/ppm: 0.85-0.90 (m, 10H), 0.92-1.22 (t, 2H), 1.23-1.43 (m, 14H), 1.58-2.40 (m, 12H), 2.61-2.70 (t, 1H), 2.71-2.88 (t, 1H), 4.75 (m, 1H), 6.60-6.65 (t, 1H), 6.78-6.90 (m, 1H). EI-MS m/z: 432 $[M]^+$.

Comparative Example 2 (CE2)

Synthesis of 3CCYOCp3

3CCYOCp3 has the formula (c-2):

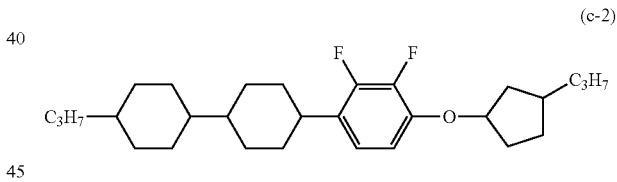

(c-2)

3CCYOCp3 was synthesized according to the process employed for synthesizing 2CCYOCp3 (Comparative Example 1), except that:

in step (1c) of Comparative Example 2, 4-(4-propylcyclohexyl)cyclohexanone was used to replace 4-(4-ethylcyclohexyl)cyclohexanone, thereby obtaining 1-(4-(3-propylcyclopentyloxy)-2,3-difluorophenyl)-4-(4-propylcyclohexyl) cyclohexanol;

in step (2c) of Comparative Example 2, 1-(4-(3-propylcyclopentyloxy)-2,3-difluorophenyl)-4-(4-propylcyclohexyl) cyclohexanol was used to replace compound 13, thereby obtaining 1-(3-propylcyclopentyloxy)-4-(4-(4-propylcyclohexyl)cyclohex-1-enyl)-2,3-difluorobenzene; and in step (3c) of Comparative Example 2, 1-(3-propylcyclopentyloxy)-4-(4-(4-propylcyclohexyl)cyclohex-1-enyl)-2,3-difluorobenzene was used to replace compound 14, thereby obtaining 3CCYOCp3. $^1$H-NMR (300 MHz, $CDCl_3$) δ/ppm: 0.795-1.01 (m, 10H), 1.08-1.16 (t, 4H), 1.14-1.46 (m, 12H), 1.47-1.63 (m, 2H), 1.71-2.36 (m, 12H), 2.61-2.98 (m, 1H), 4.72-4.74 (m, 1H), 6.60-6.78 (t, 1H), 6.81-6.90 (m, 1H). EI-MS m/z: 446 $[M]^+$.

Comparative Example 3 (CE3)

Synthesis of 5CCYOCp3

5CCYOCp3 has the formula (c-3):

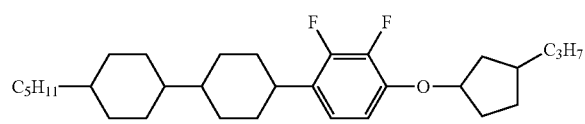

(c-3)

5CCYOCp3 was synthesized according to the process employed for synthesizing 2CCYOCp3 (Comparative Example 1), except that:

in step (1c) of Comparative Example 3, 4-(4-pentylcyclohexyl)cyclohexanone was used to replace 4-(4-ethylcyclohexyl)cyclohexanone, thereby obtaining 1-(4-(3-propylcyclopentyloxy)-2,3-difluorophenyl)-4-(4-pentylcyclohexyl)cyclohexanol;

in step (2c) of Comparative Example 2, 1-(4-(3-propylcyclopentyloxy)-2,3-difluorophenyl)-4-(4-pentylcyclohexyl)cyclohexanol was used to replace compound 13, thereby obtaining 1-(3-propylcyclopentyloxy)-4-(4-(4-pentylcyclohexyl)cyclohex-1-enyl)-2,3-difluorobenzene; and in step (3c) of Comparative Example 2, 1-(3-propylcyclopentyloxy)-4-(4-(4-pentylcyclohexyl)cyclohex-1-enyl)-2,3-difluorobenzene was used to replace compound 14, thereby obtaining 5CCYOCp3. $^1$H-NMR (400 MHz, CDCl$_3$) δ/ppm: 0.86-0.92 (m, 10H), 1.14-1.33 (m, 22H), 1.81-2.36 (m, 12H), 2.85-2.87 (m, 1H), 4.75 (m, 1H), 6.59-6.65 (t, 1H), 6.77-6.89 (m, 1H). EI-MS m/z: 474 [M]$^+$.

Comparative Example 4 (CE4)

Synthesis of 3CPYOCp3

3CPYOCp3 was synthesized by the following steps (1d) to (6d) according to the following Scheme 7.

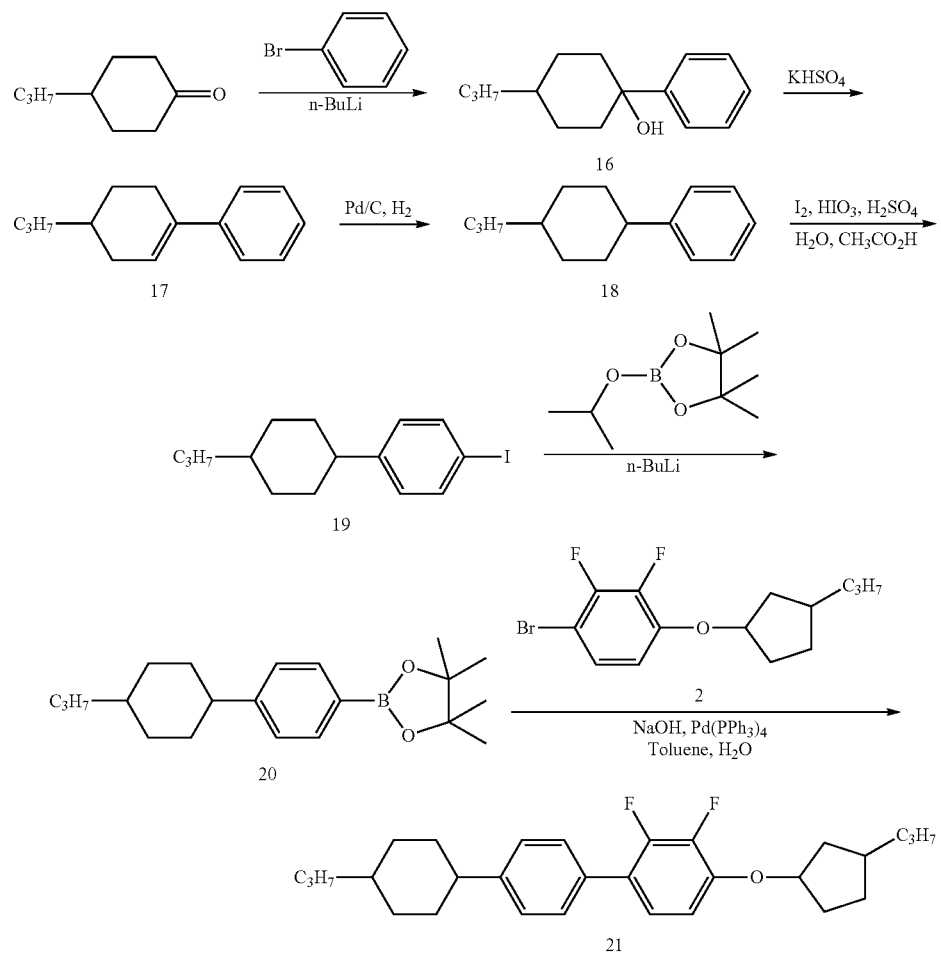

Scheme 7

Step (1d) Synthesis of 1-phenyl-4-propylcyclohexanol (compound 16 shown in scheme 7)

5 g (31.84 mmol) of 1-bromobenzene was dissolved using dry THF, and then poured into a dry 250 ml two-neck round-bottom flask. Subsequently, 16.5 ml (41.39 mmol) of n-butyllithium (n-BuLi) was slowly injected into the flask at a low temperature (−78° C.) under nitrogen gas ambient to allow a reaction to take place at the low temperature for one hour, and 4.46 g (31.84 mmol) of 4-propylcyclohexanone was further slowly injected to allow a reaction to take place for another one hour. After the reaction was completed, the reaction mixture was vacuum concentrated to remove solvent(s), and was extracted using an extracting solution including ethyl acetate and distilled water to obtain an organic phase. After the organic phase was processed to remove solvent(s) therefrom, it was purified by column chromatography (eluting solvent: n-hexane), thereby obtaining 3.7 g of the compound 16 shown in scheme 7 (yield 53%).

Step (2d) Synthesis of 1-(4-propylcyclohex-1-enyl)benzene (compound 17 shown in scheme 7)

3.7 g (16.9 mmol) of compound 16 was added to a 250 ml two-neck round-bottom flask, and then 3 g of $KHSO_4$ was added to allow a reaction to take place at 110° C. for 5 hours. After the reaction was completed, the reaction mixture was filtered off under reduced pressure to remove the solid part and to collect filtrate. The filtrate was vacuum concentrated to remove solvent(s), and then purified by column chromatography (eluting solvent: n-hexane), thereby obtaining 2.5 g of the compound 17 shown in scheme 7 (yield 73%).

Step (3d) Synthesis of 1-(4-propylcyclohexyl)benzene (compound 18 shown in scheme 7)

2.5 g (12.4 mmol) of compound 17 was placed in a 250 ml two-neck round-bottom flask, was dissolved using a mixture including 30 ml of toluene and 70 ml of methanol, followed by addition of 20 mg of palladium on carbon (Pd/C) to allow a reaction to take place under hydrogen gas ambient for 14 hours. After the reaction was completed, the reaction mixture was gravity filtered to remove the solid part and to collect filtrate. The filtrate was vacuum concentrated to remove solvent(s), and then purified by column chromatography (eluting solvent: n-hexane), thereby obtaining 2.4 g of the compound 18 shown in scheme 7 (yield 95%).

Step (4d) Synthesis of 1-iodo-4-(4-propylcyclohexyl)benzene (compound 19 shown in scheme 7)

2.4 g (11.86 mmol) of compound 18, 1.50 g (5.93 mmol) of iodine, 0.70 g (4.03 mmol) of periodic acid, 10 ml of sulfuric acid (98%), 15 ml of distilled water, and 90 ml of acetic acid (99%) were added into a 250 ml single-neck flask, and then heated under reflux at 85° C. for 18 hours, followed by extraction using an extracting solution including ethyl acetate and distilled water to obtain an organic phase. The organic phase was dehydrated using anhydrous magnesium sulfate, was gravity filtered to remove solids of magnesium sulfate, was vacuum concentrated to remove solvent(s), and was purified by column chromatography (eluting solvent: n-hexane), thereby obtaining 2.4 g of the compound 19 shown in scheme 7 (yield 61%).

Step (5d) Synthesis of 4,4,5,5-tetramethyl-2-(4-(4-propylcyclohexyl)phenyl)-1,3,2-dioxaborolane (compound 20 shown in scheme 7)

1 g (3.04 mmol) of compound 19 was added to a 250 ml single-neck flask. After the flask was vacuumed and purged with nitrogen two times, dry THF was added. Thereafter, the flask was cooled to −78° C., and 1.60 ml (3.96 mmol) of n-butyllithium (n-BuLi) was slowly added to allow a reaction to take place at −78° C. for 1 hour, followed by slow addition of 0.75 ml (3.65 mmol) of 2-isopropoxy-4,4,5,5-tetramethyl-1,3,2-dioxaborolane to allow the components in the flask to continue to react for another 1 hour. Then, the temperature was raised to room temperature, and 10 ml of distilled water was added. The reaction mixture was vacuum concentrated to remove THF, and extracted using an extracting solution including ethyl acetate and distilled water to obtain an organic phase. The organic phase was dehydrated using anhydrous magnesium sulfate, was gravity filtered to remove solids of magnesium sulfate, and was vacuum concentrated to remove solvent(s), thereby obtaining 0.8 g of the compound 20 shown in scheme 7 (yield 79%).

Step (6d) Synthesis of 3CPYOCp3 (compound 21 shown in scheme 7)

0.8 g (2.43 mmol) of compound 20, 0.77 g (2.43 mmol) of compound 2, 0.2 g (5.0 mmol) of sodium hydroxide, 5 ml of distilled water, 30 ml of toluene, and 0.5 ml of a surfactant (Aliquat 336) were added to a 250 ml two-neck round-bottom flask, and then heated under reflux. Subsequently, 0.5 g of tetrakis(triphenyl phosphine)palladium(0) was added to allow the components in the flask to be heated under reflux for 18 hours. Next, the components in the flask were cooled to room temperature, and extracted using an extracting solution including ethyl acetate and distilled water to obtain an organic phase. The organic phase was dehydrated using anhydrous magnesium sulfate, was gravity filtered to remove solids of magnesium sulfate, was vacuum concentrated to remove solvent(s), and was purified by column chromatography (eluting solvent: n-hexane), thereby obtaining 0.5 g of the compound 21 shown in scheme 7 (3CPYOCp3, yield 47%). $^1$H-NMR (400 MHz, $CDCl_3$) δ/ppm: 0.81-0.91 (m, 10H), 0.93-1.64 (m, 12H), 1.78-2.07 (m, 8H), 2.40-2.60 (m, 1H), 4.78-1.81 (m, 1H), 6.69-6.77 (m, 1H), 7.03-7.08 (m, 1H), 7.25-7.28 (d, 2H), 7.41-7.48 (d, 2H). EI-MS m/z: 441 $[M]^+$.

The liquid crystal compounds of EX 1 to 6 and CE 1 to 5 were subjected to the following tests, and the results are shown in Table 1.

DSC Test 0.5 mg to 10 mg of a liquid crystal compound to be analysed using a differential scanning calorimeter (DSC) was precisely weighed and placed in an aluminum pan. During heating or cooling the liquid crystal compound in the differential scanning calorimeter, phase transitions of the liquid crystal compound could be observed by endothermic peaks or exothermic peaks. The initiation of the phase transition was used to determine a phase transition temperature.

Normally, as temperature is continuously raised, the phase of a liquid crystal compound will change from a solid crystal phase (C) to a liquid crystal phase (nematic phase, N), and then to an isotropic liquid state (I). In this test, a crystal-to-nematic transition temperature ($T_c$) and a nematic-to-liquid transition temperature ($T_{ni}$) were observed. When the crystal-to-nematic transition temperature ($T_c$) was 63° C., and the nematic-to-liquid transition temperature ($T_{ni}$ was 138° C., the phase transition of the liquid crystal compound was represented by C63N138I. A nematic temperature range ($\Delta T = T_{ni} - T_c$) was also calculated. The larger the nematic temperature range, the broader will be the operating temperature of the liquid crystal compound.

Test for Determining Refractive Index Anisotropy

A surface of a main prism was rubbed in one direction, and then a liquid crystal compound to be tested was dropped onto the rubbed surface of the main prism. A refractive index of the liquid crystal compound was measured at 25° C. using polarized light having a wavelength of 589 nm, by means of an Abbe refractometer with a polarizing plate mounted on an ocular lens thereof. A refractive index (n∥) was determined when the direction of the polarized light was parallel to the rubbing direction. A refractive index (n⊥) was determined when the direction of polarized light was perpendicular to the rubbing direction. The refractive index anisotropy (Δn) of the liquid crystal compound was calculated from the equation: Δn=n∥−n⊥. In a vertical alignment liquid crystal display unit, a refractive index anisotropy (Δn) of a liquid crystal compound preferably ranges from 0.10 to 0.20.

Test for Determining Dielectric Anisotropy

A liquid crystal compound was fed into a vertical alignment liquid crystal cell which had an average cell gap of about 9 μm. The cell was applied with a voltage of 20 V to 50 V at 25° C. When the major-axis direction of the liquid crystal molecule was parallel to a base of the vertical alignment liquid crystal cell, a capacitance (C∥) was measured to thereby calculate a dielectric (∈∥) of the liquid crystal compound. When the major-axis direction of the liquid crystal molecule was perpendicular to the base of the vertical alignment liquid crystal cell, a capacitance (C⊥) was measured to thereby calculate a dielectric (∈⊥) of the liquid crystal compound. A dielectric anisotropy (Δ∈) of a liquid crystal compound was calculated according to the equation Δ∈=∈∥−∈⊥. In a vertical alignment liquid crystal display unit, a dielectric anisotropy (Δ∈) of a liquid crystal compound is preferably about −4.5.

Test for Determining Rotational Viscosity

A liquid crystal compound was fed into a vertical alignment liquid crystal cell which had an average cell gap of about 9 μm. The cell was applied with a voltage of 20 V at 25° C., and a rotational viscosity (γ1) of the liquid crystal compound was measured based on the dielectric anisotropy (Δ∈) of the liquid crystal compound using an automatic liquid crystal tester (INSTEC Inc). In a vertical alignment liquid crystal display unit, a rotational viscosity (γ1) of a liquid crystal compound is preferably about 100 mPa·s.

TGA Test 10 mg of a liquid crystal compound was placed in a TGA pan and heated to 800° C. in air to record a 5% weight loss temperature of the liquid crystal compound using thermogravimetric analysis (TGA). The higher the 5% weight loss temperature, the greater will be the heat stability of the liquid crystal compound.

From the results shown in Table 1, it was found that the liquid crystal compounds of EX 1 to 5 had better properties in terms of dielectric anisotropy (Δ∈), refractive index anisotropy (Δn), and nematic temperature range (ΔT), in comparison with the liquid crystal compounds of CE 1 to 4. It should be noted that the liquid crystal compounds of CE 1, CE2, and CE3 (2CCYOCp3, 3CCYOCp3 and 5CCYOCp3) are examples of the liquid crystal compound represented by formula (A) in the Background section, and that the liquid crystal compound of CE 4 (3CPYOCp3) is an example of the liquid crystal compound represented by formula (B) in the Background section and does not have a liquid crystal phase (nematic phase).

Normally, when a phenylene group of a liquid crystal compound is substituted by a cyclohexylene group, the nematic temperature range (ΔT) of the liquid crystal compound will be broader. However, it was found that the liquid crystal compounds of EX1 and EX2 (2PPYOCp3 and 3PPYOCp3) had a broader nematic temperature range (ΔT) than that of CE1 and CE2 (2CCYOCp3 and 3CCYOCp3).

Normally, when a benzene ring is further included in a structure of a liquid crystal compound, both the crystal-to-nematic transition temperature ($T_c$) and the nematic-to-liquid transition temperature ($T_{ni}$) will be raised. However, it was found that the liquid crystal compound of EX 5 (3CCPYOCp) had a lower crystal-to-nematic transition temperature ($T_c$) than that of CE2 (3CCYOCp3), and thus had a broader nematic temperature range (ΔT).

Preparation of Liquid Crystal Compositions

Examples 7 to 10 (EX 7 to EX 10) and Comparative Example 5 (CE5)

In each of EX 7 to 10 and CE5, the liquid crystal composition was prepared by mixing the liquid crystal compounds listed in the following Table 2, and was subjected to the tests for determining a refractive index anisotropy, a dielectric anisotropy, and a rotational viscosity using the procedures for testing the liquid crystal compound of Example 1. The test results are also shown in Table 2.

TABLE 1

| | | Phase Transition | Δn | Δ∈ | γ1 (mPa·s) | 5% weight loss temp. (° C.) | ΔT |
|---|---|---|---|---|---|---|---|
| EX 1 | 2PPYOCp3 | C63N138I | 0.2188 | −5.1324 | −290.86 | 254.08 | 75 |
| EX 2 | 3PPYOCp3 | C73N160I | 0.2373 | −5.3011 | 204.90 | 295.80 | 87 |
| EX 3 | 5PPYOCp3 | C35N102I | 0.2225 | −3.6417 | 69.49 | 288.40 | 67 |
| EX 4 | 3PGYOCp3 | C-21N91I | 0.1979 | −5.0052 | 81.11 | 279.04 | 112 |
| EX 5 | 3CCPYOCp3 | C-4N167I | 0.0434 | −7.1399 | 114.76 | — | 171 |
| EX 6 | 3PGPOCp3 | C33N167I | 0.1037 | −3.2280 | 56.96 | — | 134 |
| CE 1 | 2CCYOCp3 | C-8N36I | −0.0170 | −1.5763 | — | — | 44 |
| CE 2 | 3CCYOCp3 | C19N67I | −0.0056 | −1.6212 | — | — | 48 |
| CE 3 | 5CCYOCp3 | — | 0.0026 | −1.5764 | — | — | — |
| CE 4 | 3CPYOCp3 | No nematic phase | — | — | — | — | — |

"—" means the item was not measured.
"ΔT" means a nematic temperature range of the liquid crystal compound.

TABLE 2

|  |  | EX 7 | EX 8 | EX 9 | EX 10 | CE 5 |
|---|---|---|---|---|---|---|
| Compound (I) | Total amount (wt %) | 11.6 | 3.6 | 3.6 | 3 | 0 |
|  | compound (wt %) | 5PPYOCp3 (11.6) | 5PPYOCp3 (3.6) | 2PPYOCp3 (3.6) | 2PPYOCp3 (3) | — |
| Compound (II) | Total amount (wt %) | 28.9 | 28.9 | 28.9 | 28.9 | 28.9 |
|  | compound (wt %) | 5CCO1(4.8) 3CC5(9.8) 5CP3(14.3) | 5CCO1(4.8) 3CC5(9.8) 5CP3(14.3) | 5CCO1(4.8) 3CC5(9.8) 5CP3(14.3) | 5CCO1(4.8) 3CC5(9.8) 5CP3(14.3) | 5CCO1(4.8) 3CC5(9.8) 5CP3(14.3) |
| Compound (III) | Total amount (wt %) | 59.5 | 67.5 | 67.5 | 68.1 | 71.1 |
|  | compound (wt %) | 3CYO4(10) 5CYO2(10.1) 2CCY1(9.9) 3CCY1(9.9) 5CCYO2(9.8) 3CCYO2(9.8) | 3CYO4(10) 5CYO2(10.1) 2CCY1(9.9) 3CCY1(9.9) 5CCYO2(9.8) 3CCYO2(9.8) 2CPYO2(8) | 3CYO4(10) 5CYO2(10.1) 2CCY1(9.9) 3CCY1(9.9) 5CCYO2(9.8) 3CCYO2(10.8) 2CPYO2(7) | 3CYO4(10) 5CYO2(7.1) 2CCY1(9.9) 3CCY1(9.9) 5CCYO2(9.8) 3CCYO2(9.8) 2CPYO2(11.6) | 3CYO4(10) 5CYO2(10.1) 2CCY1(9.9) 3CCY1(9.9) 5CCYO2(9.8) 3CCYO2(9.8) 2CPYO2(11.6) |
| Properties | Δε | −3.17 | −3.26 | −3.11 | −3.31 | −3.387 |
|  | Δn | 0.09435 | 0.09025 | 0.09765 | 0.09995 | 0.09035 |
|  | γ1 (mPa·s) | 87.60 | 82.66 | 80.69 | 86.81 | 86.43 |

\* Compounds (I), (II) and (III) are the liquid crystal compounds represented by the formulas (I), (II) and (III), respectively.

From the results shown in Table 2, it was found that although the rotational viscosity (γ1) of each of the liquid crystal compositions of EX 7 and EX 10 was slightly higher than that of CE 5, each of the liquid crystal compositions of EX 7 and EX 10 had a better refractive index anisotropy (Δn). Although the liquid crystal composition of EX 8 had a refractive index anisotropy (Δn) substantially the same as those of CE 5, it had a better rotational viscosity (γ1) than that of CE 5. Furthermore, it should be noted that the liquid crystal composition of EX 9 had compounds substantially the same as that of CE 5, except that the liquid crystal composition of EX 9 further had a liquid crystal compound of EX 1 (2PPY-OCp3). However, the liquid crystal composition of EX 9 had a better refractive index anisotropy (Δn) and a better rotational viscosity (γ1) than those of CE5.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A liquid crystal composition comprising a first liquid crystal compound having a formula (I):

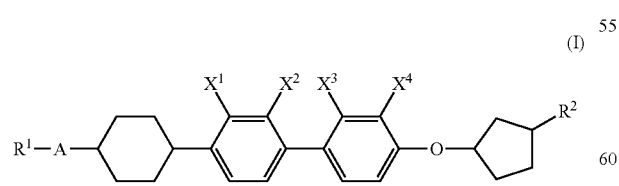
(I)

where

R$^1$ and R$^2$ are independently selected from the group consisting of H, C1-C10 alkyl, C2-C10 alkenyl, C1-C10 alkoxyl, C2-C10 alkenyloxy, C1-C10 ether, C1-C10 aldehyde, C1-C10 ketone, and C1-C10 ester;

A is selected from the group consisting of

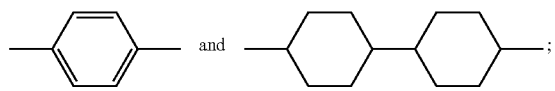

and

X$^1$, X$^2$, X$^3$ and X$^4$ are independently selected from the group consisting of H, halogen group, —CF$_3$, —CHF$_2$, —CH$_2$F, —OCF$_3$, —OCHF$_2$ and —OCH$_2$F, at least one of X$^1$, X$^2$, X$^3$ and X$^4$ being halogen group, —CF$_3$, —CHF$_2$, —CH$_2$F, —OCF$_3$, —OCHF$_2$ or —OCH$_2$F.

2. The liquid crystal composition of claim 1, wherein R$^1$ and R$^2$ are independently selected from C2-C5 alkyl.

3. The liquid crystal composition of claim 1, wherein X$^1$, X$^2$, X$^3$ and X$^4$ are independently selected from the group consisting of H and F, at least one of X$^1$, X$^2$, X$^3$ and X$^4$ being F.

4. The liquid crystal composition of claim 1, further comprising:

a second liquid crystal compound having a formula (II):

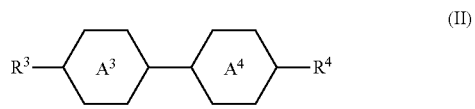
(II)

where

R$^3$ and R$^4$ are independently selected from the group consisting of H, C1-C10 alkyl, C1-C10 alkoxyl and C2-C10 alkenyl; and rings A$^3$ and A$^4$ are independently selected from the group consisting of 1,4-phenylene and 1,4-cyclohexylene; and a third liquid crystal compound having a formula (III):

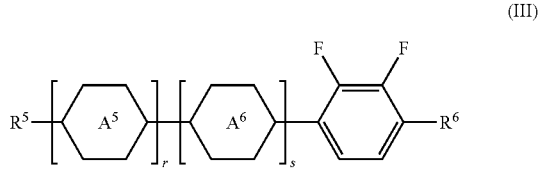

(III)

where
R⁵ and R⁶ are independently selected from the group consisting of H, C1-C10 alkyl, C1-C10 alkoxyl and C2-C10 alkenyl;
rings A⁵ and A⁶ are independently selected from the group consisting of 1,4-phenylene and 1,4-cyclohexylene; and
r=1 and s=0 or 1.

5. The liquid crystal composition of claim 4, wherein the liquid crystal composition comprises 3-20 wt % of the first liquid crystal compound, 20-40 wt % of the second liquid crystal compound, and 40-75 wt % of the third liquid crystal compound, based on the total weight of the liquid crystal composition.

6. The liquid crystal composition of claim 5, wherein the liquid crystal composition comprises 3-12 wt % of the first liquid crystal compound, 20-30 wt % of the second liquid crystal compound, and 60-75 wt % of the third liquid crystal compound, based on the total weight of the liquid crystal composition.

7. A liquid crystal compound having a formula (IV):

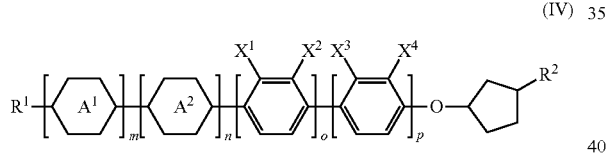

(IV)

where
R¹ and R² are independently selected from the group consisting of H, C1-C10 alkyl, C2-C10 alkenyl, C1-C10 alkoxyl, C2-C10 alkenyloxy, C1-C10 ether, C1-C10 aldehyde, C1-C10 ketone, and C1-C10 ester;
rings A¹ and A² are independently selected from the group consisting of fluorine-substituted and unsubstituted 1,4-phenylene, fluorine-substituted and unsubstituted 1,4-cyclohexylene, 2,5-tetrahydropyranylene, and 3,6-tetrahydropyranylene;
X¹, X², X³ and X⁴ are independently selected from the group consisting of H, halogen group, —CF₃, —CHF₂, —CH₂F, —OCF₃, —OCHF₂ and —OCH₂F, at least one of X¹, X², X³ and X⁴ being halogen group, —CF₃, —CHF₂, —CH₂F, —OCF₃, —OCHF₂ or —OCH₂F; and
m+n=1 or 2, o and p are independently 1 or 2, and m+n+o+p wherein when o or p is 2, two substituted phenylene rings are the same or different, and wherein when m+n=1 and each of o and p is 1, both rings A¹ and A² are not 1,4-cyclohexylene.

8. The liquid crystal compound of claim 7, wherein R¹ and R² are independently selected from C2-C5 alkyl.

9. The liquid crystal compound of claim 7, wherein rings A¹ and A² are independently selected from the group consisting of 1,4-phenylene and 1,4-cyclohexylene.

10. The liquid crystal compound of claim 7, wherein o=1 and p=1.

11. The liquid crystal compound of claim 10, wherein X¹ is H, X² is H or F, and X³ and X⁴ are independently selected from the group consisting of halogen group, —CF₃, —CHF₂, —CH₂F, —OCF₃, —OCHF₂ and —OCH₂F.

12. The liquid crystal compound of claim 11, wherein m=1, n=0, and ring A¹ is 1,4-phenylene.

13. The liquid crystal compound of claim 12, wherein m=1, n=1, and rings A¹ and A² each are 1,4-cyclohexylene.

14. A liquid crystal composition comprising a primary liquid crystal compound having a formula (IV):

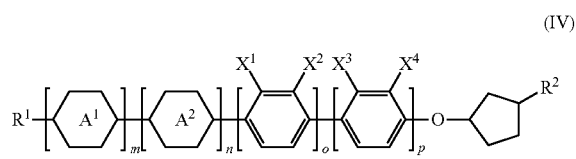

(IV)

where
R¹ and R² are independently selected from the group consisting of H, C1-C10 alkyl, C2-C10 alkenyl, C1-C10 alkoxyl, C2-C10 alkenyloxy, C1-C10 ether, C1-C10 aldehyde, C1-C10 ketone, and C1-C10 ester;
rings A¹ and A² are independently selected from the group consisting of fluorine-substituted and unsubstituted 1,4-phenylene, fluorine-substituted and unsubstituted 1,4-cyclohexylene, 2,5-tetrahydropyranylene, and 3,6-tetrahydropyranylene;
X¹, X², X³ and X⁴ are independently selected from the group consisting of H, halogen group, —CF₃, —CHF₂, —CH₂F, —OCF₃, —OCHF₂ and —OCH₂F, at least one of X¹, X², X³ and X⁴ being halogen group, —CF₃, —CHF₂, —CH₂F, —OCF₃, —OCHF₂ or —OCH₂F; and
m+n=1 or 2, o and p are independently 1 or 2, and m+n+o+p≥3, wherein when o or p is 2, two substituted phenylene rings are the same or different, and wherein when m+n=1 and each of o and p is 1, both rings A¹ and A² are not 1,4-cyclohexylene.

15. The liquid crystal composition of claim 14, further comprising:
a secondary liquid crystal compound having a formula (II):

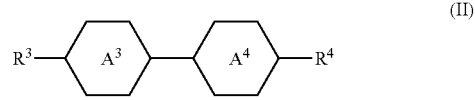

(II)

where
R³ and R⁴ are independently selected from the group consisting of H, C1-C10 alkyl, C1-C10 alkoxyl and C2-C10 alkenyl; and
rings A³ and A⁴ are independently selected from the group consisting of 1,4-phenylene and 1,4-cyclohexylene; and
a tertiary liquid crystal compound having a formula (III):

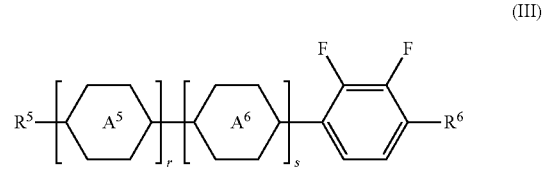

(III)

where
$R^5$ and $R^6$ are independently selected from the group consisting of H, C1-C10 alkyl, C1-C10 alkoxyl and C2-C10 alkenyl;
rings $A^5$ and $A^6$ are independently selected from the group consisting of 1,4-phenylene and 1,4-cyclohexylene; and
r=1 and s=0 or 1.

16. The liquid crystal composition of claim 15, wherein the liquid crystal composition comprises 3-20 wt % of the primary liquid crystal compound, 20-40 wt % of the secondary liquid crystal compound, and 40-75 wt % of the tertiary liquid crystal compound, based on the total weight of the liquid crystal composition.

17. The liquid crystal composition of claim 16, wherein the liquid crystal composition comprises 3-12 wt % of the primary liquid crystal compound, 20-30 wt % of the secondary liquid crystal compound, and 60-75 wt % of the tertiary liquid crystal compound, based on the total weight of the liquid crystal composition.

18. The liquid crystal composition of claim 7, wherein in the liquid crystal compound having formula (IV) $X^1$, $X^2$, $X^3$ and $X^4$ are independently selected from the group consisting of H and F; and $R^1$ and $R^2$ are C1-C10 alkyl.

19. The liquid crystal composition of claim 14, wherein in the primary liquid crystal compound having formula (IV) X', $X^2$, $X^3$ and $X^4$ are independently selected from the group consisting of H and F; and $R^1$ and $R^2$ are C1-C10 alkyl.

* * * * *